June 7, 1960 S. KELLER 2,939,206
METHOD OF MANUFACTURING OPEN-WEB METAL JOISTS
Filed March 1, 1955 6 Sheets-Sheet 2
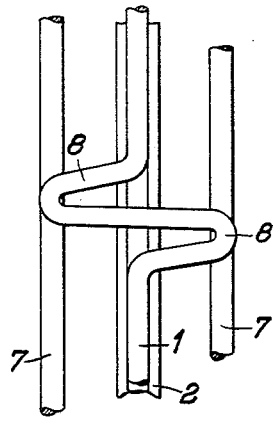
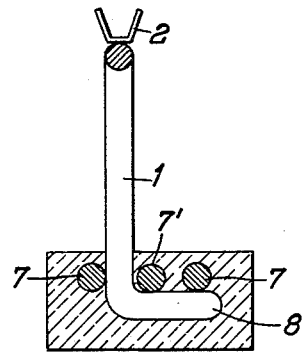
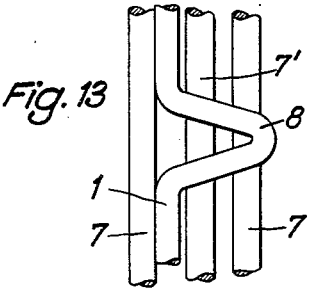
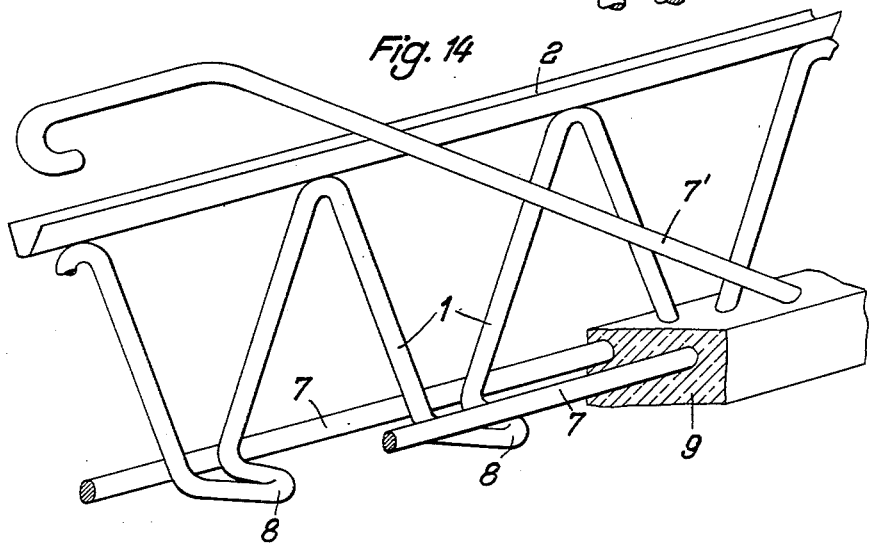
Inventor:
Stefan Keller
By Riner and Riner
Attorneys June 7, 1960 S. KELLER 2,939,206
METHOD OF MANUFACTURING OPEN-WEB METAL JOISTS
Filed March 1, 1955 6 Sheets-Sheet 3
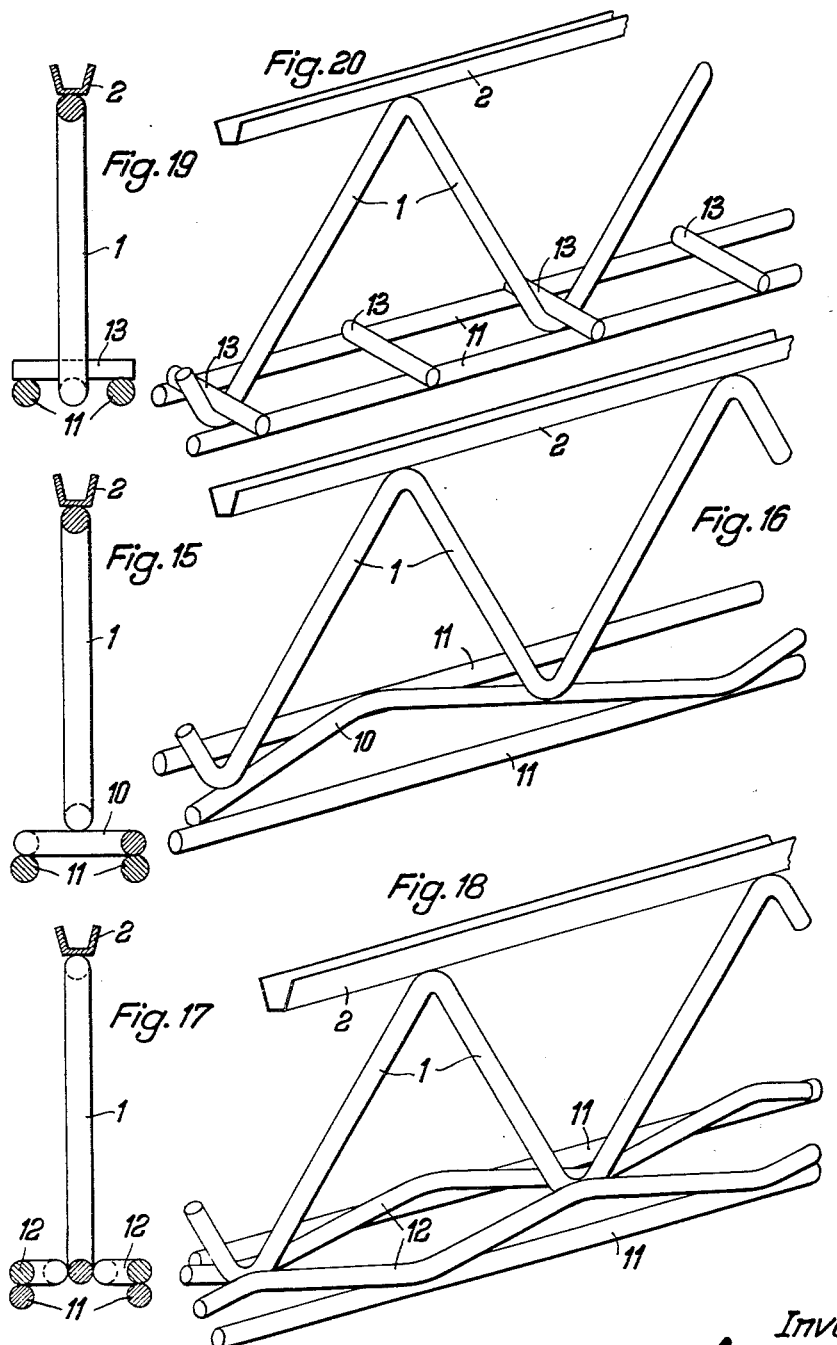
Inventor:
Stefan Keller
By Ries and Ries
Attorneys

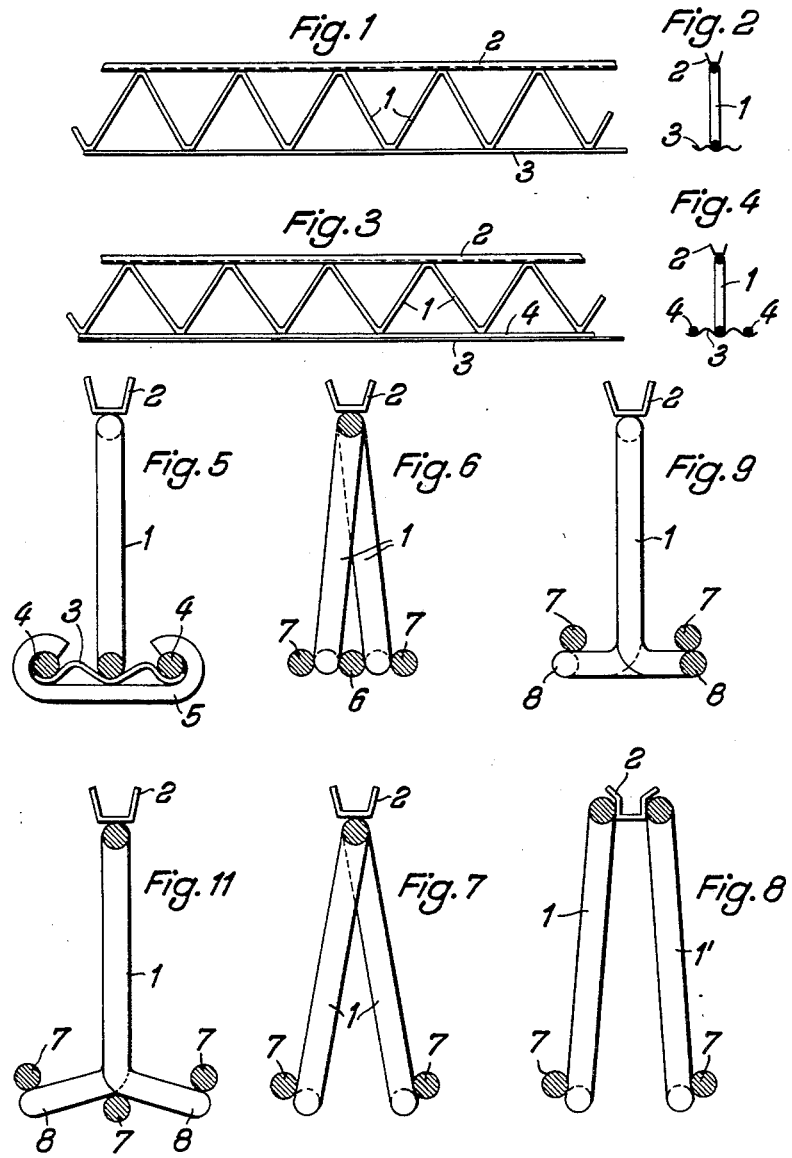

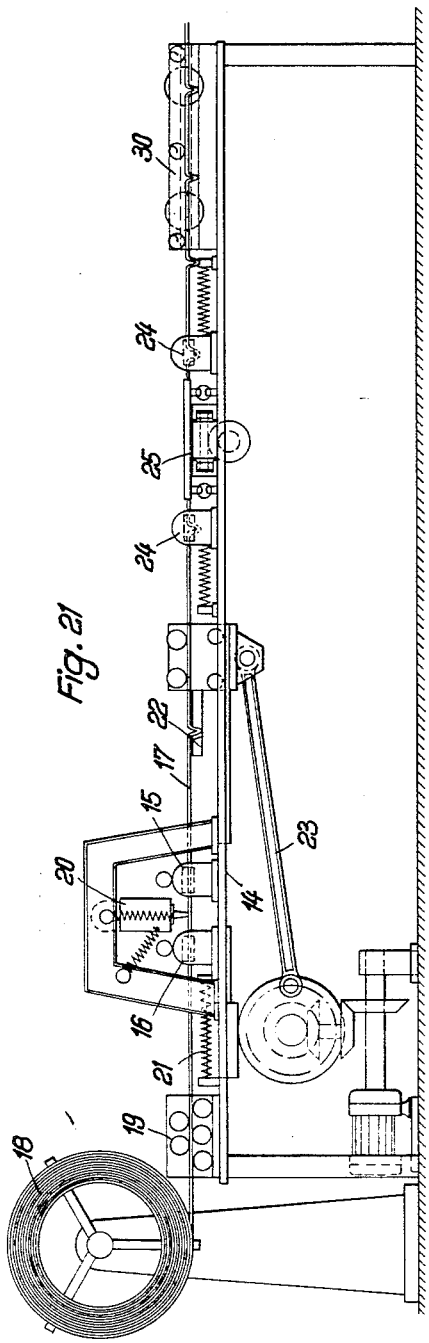
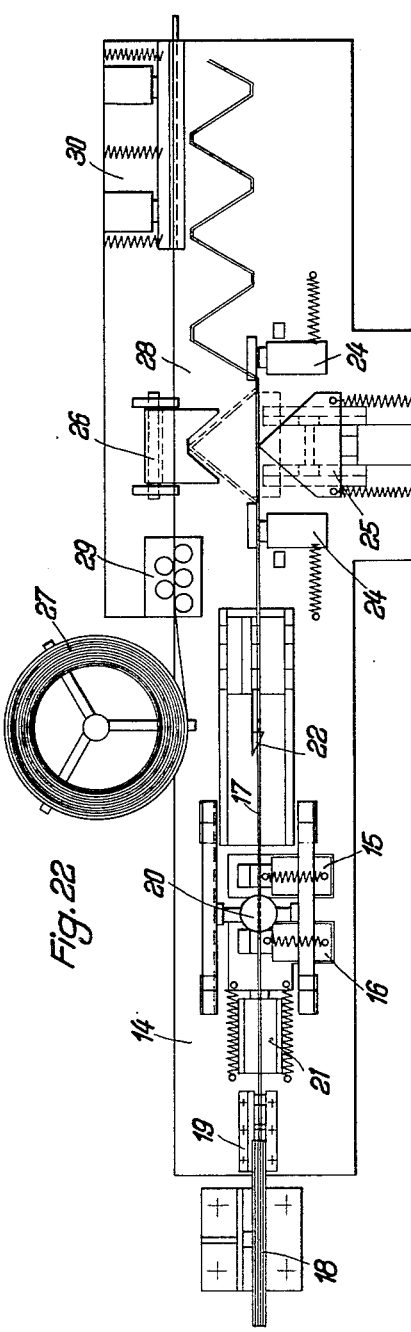

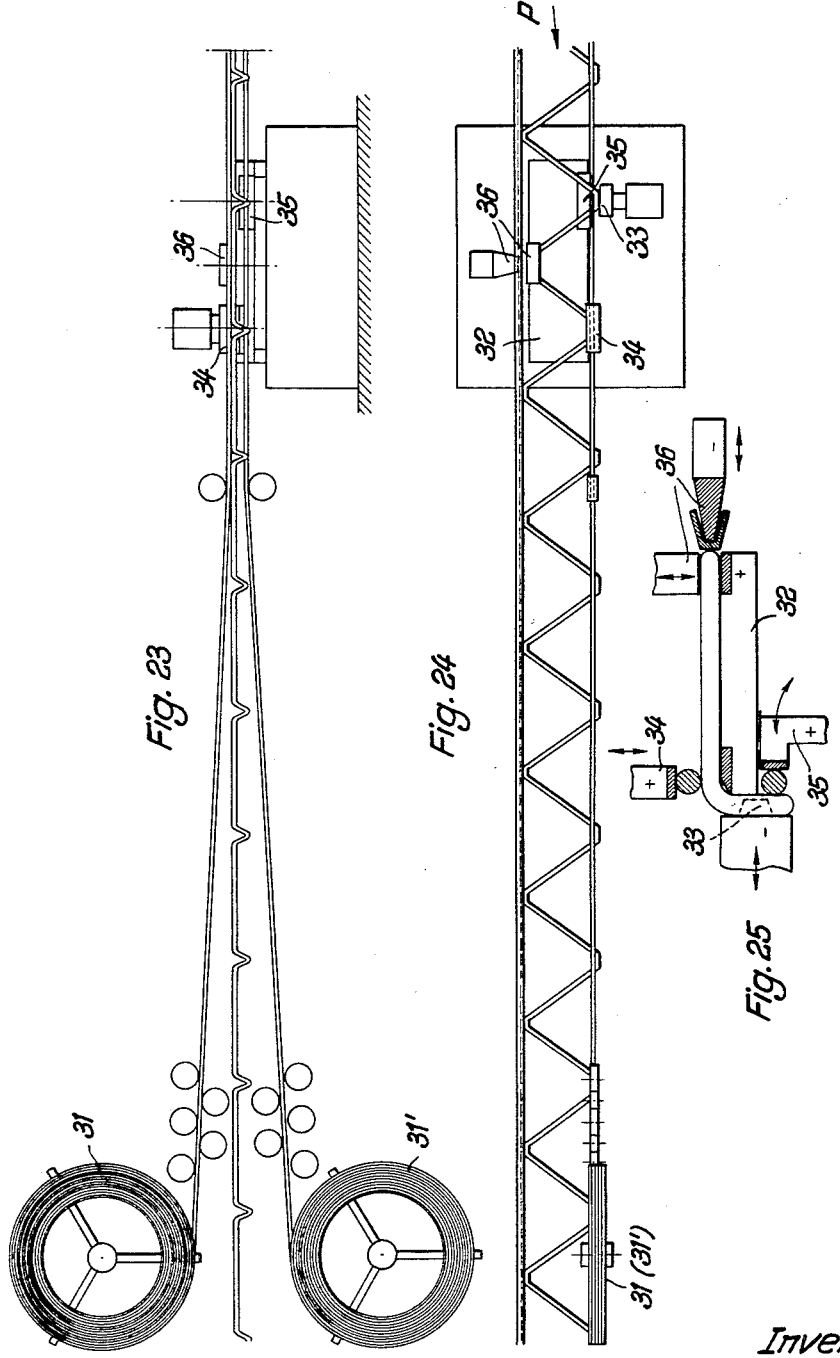

June 7, 1960  S. KELLER  2,939,206
METHOD OF MANUFACTURING OPEN-WEB METAL JOISTS
Filed March 1, 1955  6 Sheets-Sheet 6
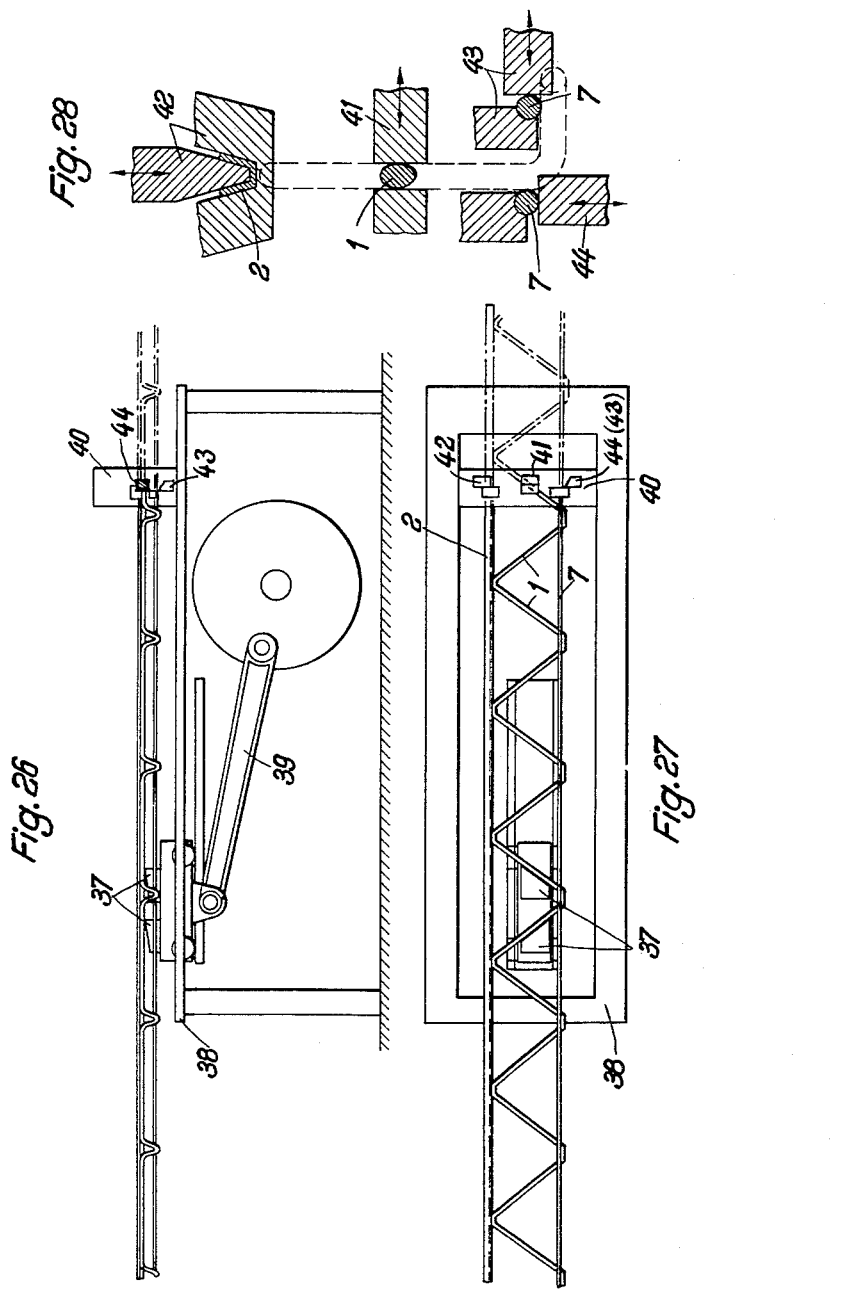

United States Patent Office 2,939,206
Patented June 7, 1960

2,939,206

METHOD OF MANUFACTURING OPEN-WEB METAL JOISTS

Stefan Keller, Irmgardstrasse 18, Munchen-Solln, Germany

Filed Mar. 1, 1955, Ser. No. 491,427

Claims priority, application Germany Mar. 16, 1954

4 Claims. (Cl. 29—155)

The present invention relates to methods of manufacturing open-web metal joists.

Open-web metal joists of the above-described character commonly embody a zig-zag or serpentine-like steel lattice member or members constituted of rods or wires welded together at the top and bottom bends of the lattice member or members to top and bottom steel chords. These chords may be T-shaped in cross-section, or they may be constituted of one or two steel rods that are L-shaped, or round, in cross-section. When used in the building of floors and ceilings, these open-web joists are subject to the following disadvantages:

If the top chords are T-shaped in cross section, it is necessary usually to build them with twice or three times the necessary amount of steel, because otherwise they would be too thin for ordinary commercial purposes, and this additional metal, of course, increases the cost.

Similar waste is involved in the use of one or two round steel chords for it is necessary materially to increase their thickness in order to enable them to withstand the forces caused by the weight of the flooring and ceiling upon the top chord of the open-web joist.

The cost of T-shaped or L-shaped chords, moreover, is greater than that of chords of round cross-section. In addition, however, they have the disadvantage that they provide only a coarse adjustment with respect to proper dimensioning. A difference of weight of nearly two kilograms per meter, for example, results from a difference of between 50 and 60 millimeters in the thickness of the T.

Though it is, indeed, possible, with a bottom steel chord of round construction, to obtain approximately proper such dimensioning, the open-web joist embodying such a bottom steel chord is so weak sidewise that, in practice, it is not adapted for use in the building of rooms of ordinary widths. Even when the open-web joist is provided with a bottom chord comprising both a right rod and a left rod, the same disadvantage nevertheless obtains, because the joist is too soft along one axis, which is especially serious in the case of floorings and ceilings, because failure properly to support floorings and ceilings may cause serious accidents.

A further disadvantage has been that the top and bottom chords have heretofore been of the same width, which interferes with their facilities of handling.

Still another disadvantage has been the relatively great cost of manufacturing these open-web joists, for their construction has been such that it has been necessary to manufacture them one at a time, by hand, out of rods or the like from 6 to 12 meters long, which has involved considerable waste.

An object of the present invention is to provide a new and improved method of manufacturing open-web metal joists of the above-described character.

Still a further object is to provide a new and improved method of manufacturing lattice supports of the above-described character that shall operate automatically and continually, thereby conducing to economy.

Other and further objects of the invention will be explained hereinafter and will particularly pointed out in the appended claims.

With the above ends in view, the new and improved method of the present invention comprises a continuous process, without interruption, of feeding a continuous wire, as from a reel, preferably step by step, bending the wire into zig-zag lattice form, feeding continuous top and bottom chord members in superposed relation to the top and bottom bends of the lattice member thus formed, joining the top and bottom chord members to the respective top and bottom bends of the lattice member, and cutting the product into predetermined lengths. The wires, bands and the like and the various other stock materials are fed to the various bending, welding and cutting apparatus, which operate to perform their various functions preferably during the intervals of time between the steps of feed, when the work is stationary.

The method may be carried out in a continuous manner, by a machine, a preferred embodiment of which, specially designed for the purpose, is illustrated herein.

The invention will now be more fully explained in connection with the accompanying drawings, in which Fig. 1 is a side elevation of an open-web joist member which may be manufactured by the method of the present invention; Fig. 2 is a vertical section of the same; Figs. 3 and 4 are views similar to Figs. 1 and 2, respectively, of a modification; Figs. 5 to 9 are sections similar to Figs. 2 and 4, upon a larger scale, of further modifications; Fig. 10 is an underside plan of the modification shown in Fig. 9; Fig. 11 is a section similar to Figs. 5 to 9 of a further modification; Fig. 12 is a similar section showing the bottom part of the open-web joist and the bottom chord embedded in concrete or the like; Fig. 13 is an underside plan, similar to Fig. 10, of the modification shown in Fig. 12, but with the concrete or other embedding material of Fig. 12 omitted; Fig. 14 is a perspective, partly in section, of the modification shown in Fig. 13; Figs. 15, 17 and 19 are sections similar to Figs. 5 to 9 and 11 of still further modifications; Figs. 16, 18 and 20 are respective corresponding perspectives; Fig. 21 is a side elevation of the left-hand part, namely, the part for bending the wire stock into zig-zag lattice form, of a preferred machine for manufacturing the open-web joist member shown in Figs. 12 and 13; Fig. 22 is a corresponding plan; Figs. 23 and 24 are views corresponding to Figs. 21 and 22, respectively, of an intermediate part of the machine, namely, the welding part; Fig. 25 is an end view, upon a larger scale, looking in the direction of the arrow P of Fig. 24; Figs. 26 and 27 are corresponding views of the right-hand part, namely, the cutting part, of the machine shown in Figs. 21 and 23 and 22 and 24, respectively; and Fig. 28 is a vertical section, upon a larger scale, of the right-hand part of the machine shown in Figs. 26 and 27.

The open-work metal joist member 1 is shown in Figs. 1 and 2 bent substantially in a plane into zig-zag or serpentine lattice form out of a steel rod that is round in cross-section. The angle between adjacent arms of each bend of the zig-zag is shown acute. It is preferably not more than ninety degrees.

The top chord member 2 is shown as bent longitudinally out of a steel band to provide the shape of substantially a U or V in transverse cross-section, with the U or V open at the top, and with the bottom part of the U or V joined, as by welding, to the top bends of the lattice member 1. The bottom chord member 3 is shown also as a longitudinally bent steel band, joined, as by welding, to the bottom bends of the lattice member 1. The bottom chord member 3 is shown wider than the top chord member 2, with a plurality of transversely disposed wave bends. The top and bottom chord members 2 and 3 are shown disposed symmetrically with respect to the plane of the lattice member 1. Particularly in the case of the wider bottom chord member 3, the symmetry enhances the corresponding cross-sectional stiffness of the open-web joist.

The open-web joist illustrated in Figs. 1 and 2 represents a basic type, in the form of an inverted T, that may be manufactured, as hereinafter described, by a continuous process out of continuous endless stock. Modifications of this basic type are illustrated in other figures.

According to the modification illustrated in Figs. 3 and 4, the bottom chord member is constituted not only of the bottom chord member 3 of Figs. 1 and 2, but also of two symmetrically disposed reinforcing steel rod members 4, one along each longitudinally disposed margin of the bottom chord member 3 of Figs. 1 and 2. These steel reinforcing rod members 4 may be joined to the bottom chord member 3 of Figs. 1 and 2 in any desired manner, as by spot welding, or by means of clamps 5, as shown in Fig. 5.

To the end of increasing the lateral stiffness of the open-work joist, the planar acute-angled V's of the lattice member 1 may successively be bent or displaced out of the plane of the lattice member substantially about the top bends of the lattice member 1 as a fulcrum, or at a lower point or points, alternately to the right and the left a distance just sufficient to provide a space, as illustrated in Fig. 6, to receive a reinforcing rod 6. The reinforcing rod 6 may be joined, as by welding, to and between the lower ends of the displaced planar acute-angled V's, at their inner surfaces. Since the reinforcing rod 6 becomes thus positioned in the former plane of the lattice member 1, the symmetry of all the parts is maintained. An additional reinforcing rod 7 is shown in Fig. 6 joined, as by welding, to the outer faces of the lower ends of the planar acute-angled V's of the lattice member 1 displaced to the left, and another additional reinforcing rod 7 is shown similarly joined to the outer faces of the lower ends of the alternately disposed planar acute-angled V's of the lattice member 1 displaced to the right. The addition of the two rods 7, therefore, does not destroy the symmetry. The bottom chord member 3 of Fig. 6, therefore, is constituted of the two outer reinforcing rods 7 and the intermediately disposed reinforcing rod 6.

Considerable stiffness may be obtained, however, even if the intermediately disposed rod 6 of Fig. 6 is omitted, as illustrated in Fig. 7. Though the stiffness provided by the intermediately disposed rod 6 is thereby sacrificed, the alternately disposed acute-angled V's of the lattice member 1, on the other hand, may be displaced farther apart, thus increasing the width of the lower chord. The lower chord, in this instance, is constituted of only the two rods 7, and they are displaced laterally a still greater distance than the width of the top chord 2.

An effect similar to that provided by the alternately displaced acute-angled V's of the lattice member 1 shown in Figs. 6 and 7 may be obtained with the aid of two separate lattice members 1 and 1', the upper bends of which are joined to the lower part of the U or V, either at the bottom thereof, or, as shown in Fig. 8, on opposite sides of the bottom.

According to the modification illustrated in Figs. 9 and 10, the bottom chord is constituted of the two rods 7, but its function is aided by small loops 8. The loops 8 are shown bent transversely outward out of the plane of the lattice member 1, into a plane at right angles thereto, to the right and to the left, at the free ends of the lower bends of the lattice member 1, into the shape of an S in a plane perpendicular to the plane of the lattice member 1. The two rods 7 are shown joined, as by welding, to the extreme ends of the loops 8. The lateral space between the two rods 7 is therefore determined by the width of the S. Though the two rods 7 are shown welded to the upper surfaces of the loops 8, it would be equally effective to weld them to the lower surfaces or elsewhere. It is further within the scope of the present invention to introduce additional bends in the loops 8, as for example, additional bends to the right and the left. It is also within the scope of the invention to join, as by welding, a further rod 7 to the under surfaces of the loops 8, in the plane of the lattice 1, midway between the said two rods 7, as illustrated in Fig. 11. By depressing the extremities of the loops 8, as also shown in Fig. 11, the level of the further rod 7 may be raised.

It will be understood, by persons skilled in the art, that the S-shaped loop, above-described in connection with Figs. 9 and 10, may be formed before or after the bending of the wire into zig-zag lattice form. No further description thereof will therefore be given in connection with the explanation of the method hereinafter.

The loops 8 may all be bent to one side only, as shown in Figs. 12, 13 and 14, into the form of a U-shape or V-shape, instead of an S-shape. The two rods 7 of Figs. 9 and 10 may still be employed, one joined in the same manner as before described, and the other joined to the zig-zag member 1 at the points where the loops 8 are bent outward of the plane of the zig-zag member 1. The distance between the rods 7 is therefore approximately the same as the width of the loops 8. One or more further rods 7' may be joined either during the manufacture of the lattice support, or at a later time, by welding. One of the further rods 7' may be bent upward, as shown more particularly in Fig. 14, to provide a handle for manipulating the lattice support. As before stated, such manipulation is facilitated by having the bottom chord substantially wider than the top chord.

In all cases, the bottoms of the open-work joists and the bottom chords are embedded in concrete or the like 9.

In Figs. 15 and 16, the bottom chord is shown constituted of an additional planar lattice or serpentine-like member 10, in a plane at right angles to the plane of the lattice member 1, the bends of which are shown joined, as by welding, to the upper surfaces of two longitudinally disposed rods 11. This additional planar lattice may be joined to the lattice member 1 by welding the lower bends of the lattice member 1 to intermediately disposed points of the lattice member 10. The lattice member 10 and the rods 11, therefore, provide the head of an inverted T, the stem of which is provided by the lattice member 1. All parts of this open-web joist cooperate to take up the forces of tension and stress.

The arrangement of Figs. 17 and 18 is similar to that of Figs. 15 and 16, except that the lattice member 10 is replaced by two symmetrically disposed lattice members 12, each the mirror image of the other, and the bottom bends of the lattice member 1 are joined, as by welding, between the juxtaposed bends of the lattice member 12.

According to the modification of Figs. 19 and 20, the lattice members 10 and 12 of Figs. 15 to 18 are replaced by transversely disposed rods 13, so as to form a ladder-like arrangement with the longitudinally disposed rods 11. The bottom bends of the lattice member 1 are joined, as by welding, to alternately disposed rods 13. These alternately disposed rods 13 are shown welded inside the bottom bends of the lattice member 1. The transversely disposed rods 13 help to anchor the device in the concrete.

According to a feature of the present invention, the open-web joists illustrated in Figs. 1 to 20, as well as many others within the scope of the present invention, may all be manufactured according to a continuous process, out of endless stock. A preferred machine for the carrying out of this process is illustrated in Figs. 21 to 28, inclusive. This machine is designed especially for the manufacture of the open-web joists illustrated in Figs. 12 and 13.

As shown in Figs. 21 and 22, wire 17, which may be of round cross-section, is pulled, step by step, by mechanism hereinafter more fully described, from a freely rotatable reel 18, through between straightening rolls 19, and in between the jaws of two clamps 15 and 16, at a time when they are open. The clamps 15 and 16 are thereupon closed, in any desired way, mechanically or hydraulically, to hold the wire 17 tightly between them. This happens at a time between the steps of feed. The straightening rolls 19 and the clamps 15 and 16 are shown mounted upon a base plate 14.

The clamps 15 and 16 may be spaced from each other about 90 millimeters along the direction of feed of the wire 17. The forward clamp 15 is fixed upon the base plate 14. The rear clamp 16 is freely movable back and forth, toward and from the fixed clamp 15.

After the clamps 15 and 16 have become closed upon the wire 17, a plunger 20, disposed half way between and above the clamps 15 and 16, is caused to descend, hydraulically or mechanically, into engagement with the wire 17. As it continues to descend, it bends the wire 17 downward between the two clamps 15 and 16. The movable clamp 16 is at the same time actuated to the right, as viewed in Figs. 21 and 22, toward the fixed clamp 15, in opposition to the biasing action of a spring, by a piston, operating hydraulically in a cylinder 21. The plunger 20 at the same time turns about a pivot at the top of the housing in which it is contained, in opposition to the action of a diagonally disposed spring. The loop 8 shown in Figs. 12, 13 and 14 becomes thus produced downwardly in the wire 17. The plunger 20 is thereafter returned to its original upper position by a vertically disposed spring, its housing is restored to its vertical position by the diagonally disposed spring, the clamps 15 and 16 open, and the clamp 15 is spring-returned to its original position in the cylinder 21.

The rear face of a previously formed loop 8 is then engaged by a feeding member 22. This occurs at a time just before an eccentric link 23 for actuating the feeding member 22 occupies its position of dead center during its return movement. It is at the moment of dead center that the clamps 15 and 16 reopen. The feeding member 22 becomes thereupon actuated toward the right by the eccentric link 23, thus advancing the wire 17 further toward the right, and pulling more of the wire 17 from the freely rotatable reel 18. The length of travel of the feeding member 22, from is before-mentioned position of dead center, to its opposite position of dead center, may, for example, be about 300 millimeters. The distance between two loops 8 may be such as to pull about 350 millimeters of wire 17 from the reel 18. This will also provide for an angle of somewhat less than about 90 degrees between the arms of each planar acute-angled V of the lattice member 1 before described.

These planar acute-angled V's are each produced by a male die 25 that is reciprocated transversely of the line of feed of the wire 17 into engagement with the wire 17. After engaging the wire 17 the die 25 continues to travel transversely to the line of feed of the wire 17 toward a stationary female die 26. These dies 25 and 26 are each shown having faces inclined to each other at the desired angle of the planar acute-angled V. If the plane of transverse reciprocation of the die 25 is at right angles to the plane of descent of the plunger 20, the plane of the acute-angled V thus produced in the lattice member 1 will be at right angles to the plane of the loop 8. The male die 25 may be actuated toward the die 26 in any desired manner, and is illustrated as spring returned.

Just prior to the transverse actuation of the male die 25, the wire 17 is held fast by two clamps 24, one on each side of the die 25. These clamps 24 are caused to travel freely toward each other and upward toward the female die 24 during the bending of the wire 17 by the die 25, and are thereafter spring-returned. Successive V's of the lattice member 1 may thus be formed at distances of about 250 millimeters. Though some stretching of the material of the rod 17 is produced during its bending into the form of the V's, such stretching becomes compensated for in the final product.

The planar V's are therefore produced step by step, the same as the loops 8, at times when the wire stock 17 is at rest, between the steps of feed.

The formation of one loop 8 and of one V occurs during about one-quarter of the time of the cycle of operation of the machine, and the feeding of the rod 17 during half the time of that cycle of operation.

In between the times of the step-by-step feeding of the wire 17, at times when the wire 17 is at rest, the top and bottom chords are welded to the lattice member 1.

The top chord may be formed from a steel band 28, that is drawn from a freely rotatable reel 27, between straightening rolls 29, to a die 30 for longitudinally bending the band 28 into transverse cross-sectional U-shape or V-shape. After becoming thus shaped, the longitudinally bent band 28 travels adjacent to and in properly superposed relation to the top bends of the zig-zag lattice member 1, over a table 32, to welding electrodes 36.

The bottom chord may be formed from wires for the rods 7 that are at the same time unwound from freely rotatable rolls 31 and 31'. These wires, after unwinding, are straightened by straightening rolls, after which, adjacent to and in properly superposed relation over the loops 8, they travel to welding electrodes 34 and 35. The electrodes 34 serve to weld the left-hand rod 7 shown in Figs. 12 and 13 to the lattice member 1, and the electrodes 35, in cooperation with spacing fingers 33, serve to weld the right-hand rods 7 shown in Figs. 12 and 13 to the loops 8. The top and bottom chord members may be fed step by step, in synchronism with the feed of the metal wire 17, and the welding electrodes 34, 35 and 36 may be operated, in well known manner, for example, hydraulically, at times when the stock is at rest, between the steps of feed.

After the welding operations, the lattice-member 1, with the top and bottom chords thus joined thereto, is fed by members 37 forward over a table 38 to cutting members 40. As shown in Fig. 27, the members 37 are provided with diagonally disposed grooves, to correspond to the shapes of the inclined arms of the planar V's of the lattice member 1. The members 37 are shown actuated to feed the stock by an eccentric link 39.

The cutter 40 comprises a plurality of cutter members 41, 42, 43 and 44, as shown more particularly in Fig. 28. The cutter member 41 is shown cutting the lattice member 1 at an intermediate point of one of the arms of one of the planar V's. The cutter member 42 is shown cutting the top chord member 2. The cutter members 43 and 44 are shown cutting the wire rods 7. The cutters 41, 42 and 43 operate at times when the stock is at rest, between the steps of feed, resulting in the cutting of the product into predetermined lengths, each constituting a finished open-web metal joist.

The operation above-described is continual, without interruption, except at times when all the stock of any particular reel has been used up. Even at such times, there need be no interruption if the operator, sufficiently in advance, will manually grasp the terminal end portion of the stock of the about-to-be-depleted reel and weld it to the beginning end of the stock of a fresh reel. The operator will, of course, smooth over the joint thus produced at the location of the weld. Changes to wire or band stock of different diameter or shape, where needed, may similarly be made without interrupting the continuity of the operation.

In order to obtain, in the top chord, maximum stability against crushing with minimum weight, the top chord should be made out of a band of steel, and should be shaped by cold working methods, in such manner that its moment of inertia is approximately equal along the X and Y axes. This result may be attained through a U or V of suitable cross-section. A U or V that is open at the top, moreover, when the open-web joist is placed in final position, will readily receive the poured concrete.

In order that the operation may be continuous, the wires, rods, bands and the like should be long, say 60 to 200 meters. This, of course, restricts the operation to stock that can conveniently be wound on reels. The invention is not, on the other hand, restricted to use with rods of any particular cross-section, round, square or oblong. The cross-section may, for example, be oval, hexagonal or triangular, and the stock may also be twisted. The stock should in all cases be so dimensioned and shaped, however, as to yield proper cross-sectional strength, and suitable bonding to the concrete. It has already been remarked that two of the rods 7 or their equivalent of the bottom chord should be spaced as far as is practically permissible, in order to increase side stiffness.

Though the invention has been described above in connection with a method of and machine for manufacturing the open-web joist illustrated in Figs. 12 and 13, it will be obvious that modifications may be made by persons skilled in the art that will adapt the method and the machine for the manufacture of other open-web joists embodying the present invention. If, for example, instead of the loop 8 of Figs. 12, 13 and 14, it were desired to produce the S-shaped double loops 8 of Figs. 9 and 10, this could easily be effected by providing an additional plunger below the wire 17, moving upward, to one side of the downwardly moving plunger 20, along the line of feed of the wire 17. In order to manufacture the open-web joist illustrated in Figs. 19 and 20, as another example, only the slight modification would be necessary that the rod stock for the transversely disposed rods 13 of the ladder-like structure 11, 13 should be fed from continuous wire wound upon separate reels, not shown, disposed at right angles to the direction of feed of the wire for the lattice member 1 and the rods 11. This stock may be fed, at times between the steps of feed of the wire for the lattice 1 and the rods 11, into the space just above the lower bends of the lattice member 1, and welded in place prior to the next step of feed. This stock may be severed from the continuous-wire rods from which they are supplied prior to the resuming of the feed of the wire for the lattice member 1 and the rods 11.

Still further modifications will occur to persons skilled in the art, and all such are considered to fall within the spirit and scope of the present invention, as defined in the appended claims.

What is claimed is:

1. A method of manufacturing open-web metal joists that comprises feeding continuous metal stock, transversely bending the stock into the form of a transversely bent zig-zag lattice member, feeding a top metal chord member adjacent to and in superposed relation to the top bends of the lattice member, feeding a plurality of metal rods spaced apart a greater distance than the width of the chord member adjacent to and in superposed relation to the bottom bends of the lattice member, joining the top chord member and the rods to the respective top and bottom bends of the lattice member, and cutting the product into predetermined lengths.

2. A method of manufacturing open-web metal joists that comprises feeding continuous metal stock step by step, transversely bending the stock step by step into the form of a transversely bent zig-zag lattice member at times when the stock is at rest, feeding a top metal chord member adjacent to and in superposed relation to the top bends of the lattice member step by step in synchronism with the feed of the metal stock, feeding a bottom metal chord member adjacent to and in superposed relation to the bottom bends of the lattice member step by step in synchronism with the feed of the metal stock, joining the top and bottom chord members to the respective top and bottom bends of the lattice member at times when the stock is at rest, and cutting the product into predetermined lengths at times when the stock is at rest.

3. A method of manufacturing open-web metal joists that comprises feeding continuous metal stocks step by step, bending loops in the stock step by step in a predetermined plane at times when the stock is at rest, bending the stock between each two loops step by step at times when the stock is at rest to form planar V's of a zig-zag lattice member in a plane at right angles to the predetermined plane, feeding a top metal chord member adjacent to and in superposed relation to the top bends of the lattice member step by step in synchronism with the feed of the metal stock, feeding a bottom metal chord member adjacent to and in superposed relation to the bottom bends of the lattice member and the loops step by step in synchronism with the feed of the metal stock, joining the top chord member to the top bends of the lattice member at times when the stock is at rest, joining the bottom chord member to the bottom bends of the chord member and the loop at times when the stock is at rest, and cutting the stock into predetermined lengths.

4. A method of manufacturing open-web metal joists that comprises feeding a continuous metal stock step by step, bending loops in the stock step by step in a predetermined plane at times when the stock is at rest, bending the stock between each two loops step by step at times when the stock is at rest to form planar V's of a zig-zag lattice member in a plane at right angles to the predetermined plane, the said loops being at the bottom bends of said zig-zag lattice member, feeding a top metal chord member adjacent to and in superposed relation to the top bends of the lattice member step by step in synchronism with the feed of the metal stock, feeding at least two steel wires adjacent to and in superposed relation to the bottom bends of the lattice member and the loops step by step in synchronism with the feed of the metal stock, joining the top chord member to the top bends of the lattice member at times when the stock is at rest, joining the steel wires to the bottom bends of the chord member and the loop at times when the stock is at rest, so that the steel wires and the loops form a bottom chord, and cutting the stock into predetermined lengths.

References Cited in the file of this patent

UNITED STATES PATENTS

| | | |
|---|---|---|
| 2,256,812 | Miller | Sept. 23, 1941 |
| 2,308,080 | Herr | Jan. 12, 1943 |
| 2,325,200 | Young | July 27, 1943 |
| 2,339,884 | Schlumpf | Jan. 25, 1944 |
| 2,485,282 | Green | Oct. 18, 1949 |
| 2,624,430 | Macomber | Jan. 6, 1953 |
| 2,662,272 | Macomber | Dec. 15, 1953 |
| 2,746,139 | Pappelendam | May 22, 1956 |